(12) United States Patent  
Ambrozio

(10) Patent No.: US 8,469,715 B2  
(45) Date of Patent: Jun. 25, 2013

(54) DYNAMIC HUMAN MODEL

(76) Inventor: Rose Marie Ambrozio, Elizabeth, NJ (US)

( * ) Notice: Subject to any disclaimer, the term of this patent is extended or adjusted under 35 U.S.C. 154(b) by 1327 days.

(21) Appl. No.: 11/861,762

(22) Filed: Sep. 26, 2007

(65) Prior Publication Data

US 2009/0081627 A1     Mar. 26, 2009

(51) Int. Cl.
G09B 23/28     (2006.01)

(52) U.S. Cl.
USPC .................. 434/267; 434/274; 434/272

(58) Field of Classification Search
USPC ............... 446/175, 219; 434/267, 274, 272, 434/262
See application file for complete search history.

(56) References Cited

U.S. PATENT DOCUMENTS

| | | | |
|---|---|---|---|
| 338,593 A | 8/1888 | Smith | |
| 411,816 A | 10/1889 | Lee | |
| 421,833 A | 2/1890 | Henckel | |
| 2,345,489 A | 3/1944 | Lord | |
| 2,483,034 A | 8/1949 | Braeg | |
| 2,971,272 A | 2/1961 | Barlow | |
| 2,988,823 A | 6/1961 | Rosenbloom | |
| 3,009,267 A | 11/1961 | Bezark | |
| 3,213,550 A | 10/1965 | Kittner | |
| 3,855,714 A | 12/1974 | Block | |
| 3,962,801 A | 6/1976 | Gonzalez | |
| 4,323,351 A * | 4/1982 | Goldsmith | 434/274 |
| 4,561,851 A * | 12/1985 | Ferreira et al. | 434/272 |
| 4,938,696 A | 7/1990 | Foster | |
| 5,259,764 A | 11/1993 | Goldsmith | |
| 5,628,230 A | 5/1997 | Flam | |
| 5,701,897 A * | 12/1997 | Sano | 600/453 |
| 5,775,916 A | 7/1998 | Cooper | |
| 5,779,483 A * | 7/1998 | Cho | 434/262 |
| 6,080,034 A | 6/2000 | Bennett Harris | |
| 6,409,516 B1 | 6/2002 | Thill | |
| 6,474,993 B1 | 11/2002 | Grund | |
| 6,780,016 B1 | 8/2004 | Toly | |
| 7,413,441 B2 * | 8/2008 | Bigelow | 434/272 |
| 2002/0098467 A1 * | 7/2002 | Dente | 434/262 |
| 2004/0018799 A1 * | 1/2004 | Lee | 446/373 |
| 2006/0183096 A1 * | 8/2006 | Riener et al. | 434/276 |
| 2008/0227073 A1 * | 9/2008 | Bardsley et al. | 434/267 |
| 2008/0318195 A1 * | 12/2008 | Murdach | 434/274 |

FOREIGN PATENT DOCUMENTS

| | | |
|---|---|---|
| CA | 2266725 | 10/2005 |
| KR | 0038430 | 12/1996 |
| KR | 0293590 | 10/2002 |

OTHER PUBLICATIONS

3B Skinlike Product Brochure; http://www.a3bs.com, 7 pp.

* cited by examiner

*Primary Examiner* — Xuan Thai
*Assistant Examiner* — Peter Egloff
(74) *Attorney, Agent, or Firm* — Doherty & Charney LLC

(57) ABSTRACT

A dynamic human model is jointed and movable and provides an aid for understanding, studying, and mastering the structure of the human body. In one embodiment, the dynamic human model includes a skeleton model having a plurality of bone elements coupled together by articulating joints, and muscles attachable to the bone elements. The muscles are flexible for contracting and stretching. At least one of the muscles has one or more optical elements incorporated therein for generating a first color when the muscle is contracted and a second color when the muscle is stretched.

12 Claims, 12 Drawing Sheets

FIG. 2A
FIG. 2B
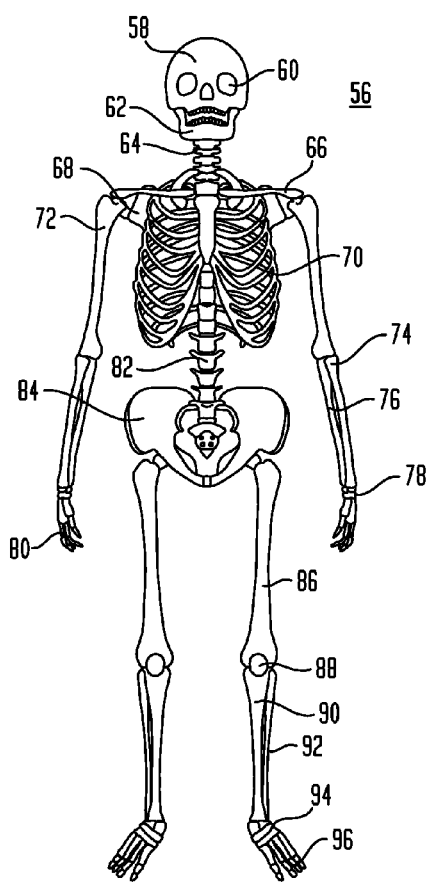
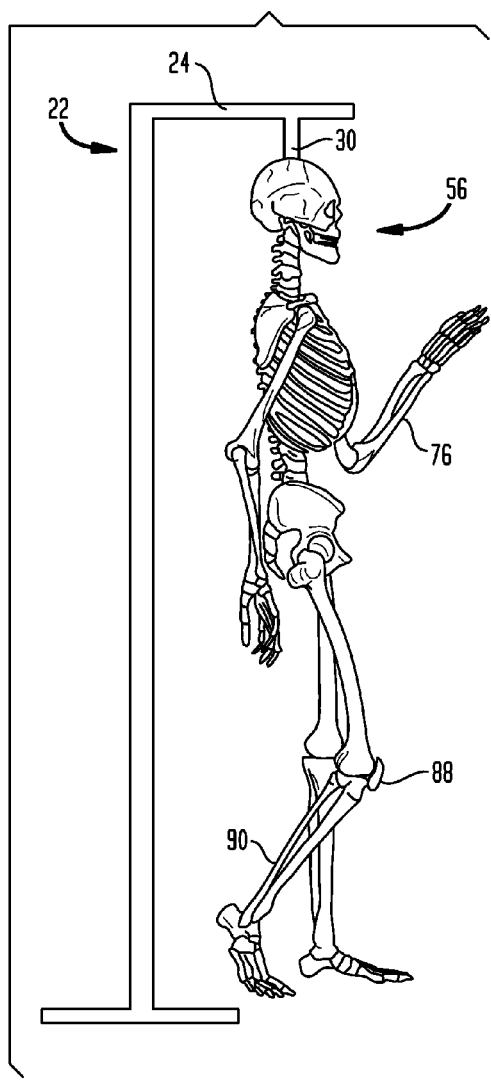

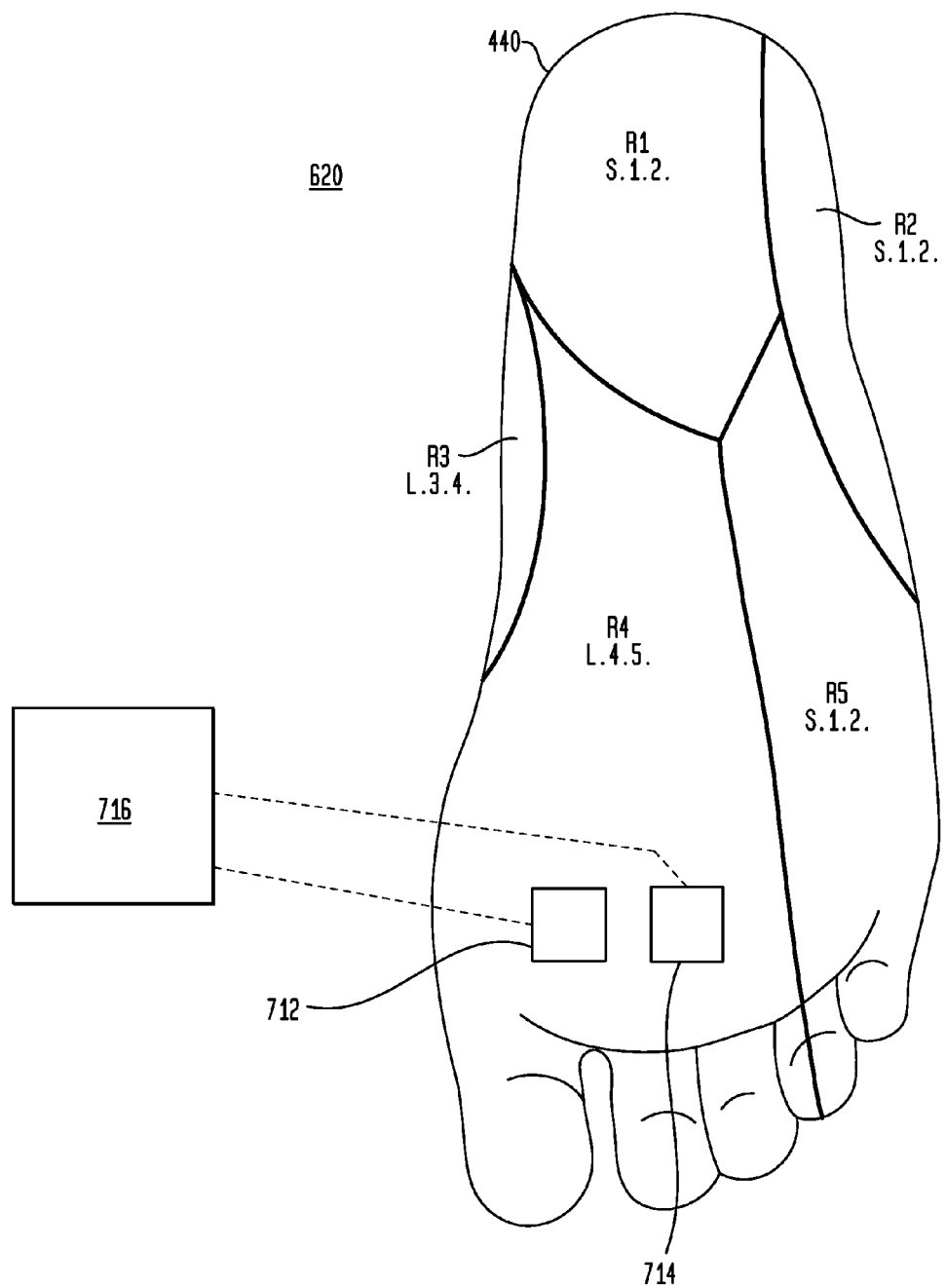

DYNAMIC HUMAN MODEL

BACKGROUND OF THE INVENTION

1. Field of the Invention

Embodiments of the present invention generally relate to models of the human body. More specifically, embodiments of the present invention relate to dynamic models of the human body.

2. Description of the Related Art

Models of the human body are used by medical, science, health, and educational organizations to train medical personnel about human anatomy, how the various parts of the body are interconnected, and how to properly treat patients. These models are also used by the same organizations to discuss medical conditions with patients so as to obtain informed consent from the patients.

There have been many models of the human body developed over the years. For example, U.S. Pat. No. 2,483,034 to Braeg discloses an educational device that graphically discloses the shapes, relative sizes, attachment locations, and function of muscles in relationship to bones. More specifically, the device in Braeg contains three-dimensional muscles which may be attached to or detached from the skeleton or other muscles of the device, in accordance with their location in the human body. The skeleton of the device is made of a solid material simulating bone, whereby the bones may be moved in a realistic fashion about the joints. The muscles are made of flexible, elastic material simulating those qualities of true muscle tissue, so as to give the student an accurate impression of muscle shape, texture, and other properties when handled on or off the skeleton. The muscles are designed to simulate true muscular action when the bones of the skeleton are moved about their joints. For instance, the patent provides a visual example of the bones and related muscles of the arm. As the bones, with attached muscles, are moved relative to the elbow joint, the muscles will flex, expand, stretch or contract in the manner of actual muscles.

U.S. Pat. No. 2,345,489 to Lord discloses an extendable sheet-like body capable of manipulation so as to show all the changes in which a structure that connects two other organs or structures of changing spatial relation may undergo. The patent provides as its primary example the suppression, relocation, or fusion of the mesentery with the parietal peritoneum.

U.S. Pat. No. 3,009,267 to Bezark discloses a transparent, hollow human skeletal model that has a plurality of joined articulated simulated skeletal components formed of opaque plastic material. The model also encloses various internal organs which are also formed of a plastic resinous material and desirably in contrasting colors or color shades. Thus, the model of the Bezark patent is able to provide a realistic three dimensional model of a human body having a clear body shell that allows visual access to the skeleton, muscles, and organs.

U.S. Pat. No. 388,593 to Smith discloses an anatomical apparatus in the form of a frame, and having the outline of a human body. Thin plates having the form of the various organs, muscles, and parts of the human body are movably attached to the frame by hanging the plates from pins positioned about the frame.

U.S. Pat. No. 3,855,714 to Block discloses an instructional device for studying organ systems, such as muscles, and their anatomical relationship to the skeleton from both anterior and posterior aspects. The device itself is comprised of a backing upon which transparent plastic components forming the composition of each major organ may be pressure-applied to their proper locations on the device. More specifically, when the muscles are applied to the device, the student can determine, through bands of color, in which direction the fibers of the muscle run.

U.S. Pat. No. 6,474,993 to Grund is directed to artificial tissue used for surgical training. In some embodiments, colorants (preferably thermocolors) are added to the artificial tissue such that the tissue exhibits a color change at one or more defined temperatures (preferably between 50° C. and 100° C.).

U.S. Pat. No. 6,080,034 to Bennet Harris is directed to a multi-cultural doll providing a color changing mechanism for changing the color of the doll to match persons of various cultures. Color changes in the doll's skin are attributed to fiber optic strands coupled to color selectors and bulbs.

U.S. Pat. No. 6,780,016 Toly is directed to a surgical trainer employing simulated human tissue made of an elastomeric composition. In some embodiments, the surgical trainer includes a simulated muscle layer consisting of a silicone blend and, preferably, a pigment.

In spite of the above advances, there remains a need for a dynamic human model that may be used for understanding, studying and mastering the structure of the human body. In addition, there remains a need for a dynamic model that may be used to teach how muscles are attached to bone to show the point of origin and insertion, how muscles contract and stretch, and how muscles interact with one another including muscle function and innervations. There is also a need for a dynamic human model that may be used to study and learn the human body's dermatome map, and what areas of the skin are supplied by a specific nerve (i.e. cutaneous innervations). Furthermore, there remains a need for a dynamic human model that simulates the actual physiological movement of each appendage and joint of a human body.

SUMMARY OF THE INVENTION

Embodiments of the present invention relate to a dynamic human musculoskeletal model, in which the muscles of the model exhibit a color change as they perform an action (e.g. are flexed). More specifically, the present invention is directed to a musculoskeletal model comprised of a skeleton having simulated muscles attached thereto. The muscles of the model are made of a flexible material, such that when the bones of the skeleton are articulated about a joint, the attached muscles perform the desired physiological movement and/or action (e.g. flex). Moreover, the invention is directed to a dynamic model whereby the color of the actual muscles performing the action changes as the muscles are flexed and/or extended. In one embodiment, the color change is a complete color change (e.g. red in the contracted position; blue in the contracted position). In another embodiment, the color change may be a change in color intensity (e.g. a more vivid red in the contracted position; a less vivid red in the relaxed or stretched position). In some embodiments, the muscles of the model are able to be attached to and detached from the bones of the skeleton so as to show the proper place of origin and insertion. Thus, the model of the present invention is able to visually illustrate, through the color changes occurring during muscle flexion and extension, the actual shapes, relative sizes and functions of muscles as well as the relationship of the muscles to bones and other muscles. In other embodiments, the dynamic model contains illustrations of nerves, arteries, and/or removable simulated internal organs.

In one embodiment of the present invention, a dynamic human model includes a skeleton model having a plurality of bone elements coupled together by articulating joints, and muscles attachable to the bone elements, whereby the muscles are flexible for contracting and stretching, and wherein each muscle has one or more optical elements incorporated therein for generating a first color when the muscle is contracted and a second color when the muscle is stretched. In one embodiment, the first color is red and the second color is blue. The one or more optical elements may be temperature responsive colorants, light emitting diodes, optical fibers, or lights. The optical elements may also include liquid crystals, silicones, rubber, elastics and polymers. The optical elements may also incorporate chemical illuminating materials. The bone elements may be made of bone, plastic, polymers, ceramics or glass.

The dynamic human model may have at least one sensor disposed in at least one of the muscles for detecting whether the muscle is contracted, stretched, or relaxed. The at least one sensor may be adapted to detect a degree to which the at least one of the muscles is contracted, stretched, or relaxed. The at least one sensor may be a motion sensor, a piezoelectric element, an optical sensor, or a pressure sensor. The dynamic human model may also include a controller having a microprocessor in communication with at least one of the sensors and the one or more optical elements. The controller may generate signals having an intensity corresponding to the degree to which the muscle elements are contracted, stretched, or relaxed.

In one embodiment, the dynamic human model may include a guide rod extending through at least one of the muscles for guiding contracting and stretching movement of the muscle. The guide rod may have a first end connected with one of the bone elements and a second end connected with another one of the bone elements.

The model may include a flexible outer skin securable over the skeleton model and the muscles, whereby at least a portion of the flexible outer skin may be removed for exposing the skeleton model and the muscles. The flexible outer skin may be selected from the group consisting of a silicone layer, a plurality of silicone layers, a fibrous layer covered by silicone, an elastomer, and a polymer. In one embodiment, the outer layer of the model, comprising a case or casing, has the appearance of a human body. The outer layer may be made of a broad ranges of materials including hardened and flexible polymers, plastics and silicones. The outer layer may be divided into separate compartments or regions that are not normally visible to the human eye. The boundaries of the compartments or regions, or the entire compartment or region, may be illuminated or show a color change when contacted, such as by using pressure or a probe. The illumination or color change in the outer layer preferably shows innervation patterns of a body, including which nerves are associated with a particular compartment or region of the body.

In one embodiment of the present invention, a dynamic human model includes a flexible outer skin covering the model, and optical elements disposed in the flexible outer skin, whereby the optical elements are adapted to be selectively activated for displaying nerve patterns in a human body. The nerve patterns may include a dermatome map, or cutaneous innervation patterns. The optical elements may include light emitting diodes, lights, optical fibers, heat activated colorants, chemically illuminating materials, and/or liquid crystals. The model may also include a skeleton model covered by the flexible outer skin, whereby at least a portion of the flexible outer skin may be removed to expose the skeleton model. The model may have one or more sensors disposed in the flexible outer skin and a controller including a microprocessor in communication with the optical elements and the one or more sensors.

In one embodiment of the present invention, a dynamic human model includes a skeleton model having a plurality of bone elements coupled together by articulating joints, and a flexible outer skin overlying the skeleton model and being adapted to flex and bend with the skeleton model, whereby the outer skin has optical elements incorporated therein for identifying areas of the skin that are supplied by specific nerves. The bone elements may be made of elements having the appearance of human bones including real bone, osseous material, plastic, polymers, ceramic, or glass. The skeleton model may have hinges, ball and socket joints, and/or stops for replicating the actual physiological movement of a human body. The model may have one or more sensors disposed in the flexible outer skin and a microprocessor that receives signals from the one or more sensors. The microprocessor is preferably in communication with the optical elements for selectively activating the optical elements in response to signals received from the sensors.

In one embodiment, the flexible outer skin of the dynamic model may be manipulated to show the dermatomes and cutaneous innervations. The manipulation may be conducted through thermodynamics by manipulating the outer skin with the warm tip of a probe. In these embodiments, the outer skin may include a colorant that changes color in response to temperature.

In one embodiment, the flexible outer skin or the muscles may be made of flexible, stretchable materials such as polyethylene, polypropylene, soft rubbers, liquid crystal rubber, or polyurethane.

In one embodiment, the skeleton model disarticulates to show the action of selected muscles, such as name, primary action, agonist, antagonist, proximal and distal attachments, innervations, and blood supply. The dynamic human model may also include ligaments and provide the specific functions of the ligaments. In certain embodiments, the dynamic model may include internal organs and/or blood supply. In use, the model may be repeatedly disassembled and assembled.

These and other preferred embodiments of the present invention will be described in more detail below.

BRIEF DESCRIPTION OF THE DRAWING

So the manner in which the above recited features of the present invention can be understood in detail, a more particular description of embodiments of the present invention, briefly summarized above, may be had by reference to embodiments, which are illustrated in the appended drawing. It is to be noted, however, the appended drawing illustrates only typical embodiments of embodiments encompassed within the scope of the present invention, and, therefore, is not to be considered limiting, for the present invention may admit to other equally effective embodiments, wherein:

FIG. 2A shows a front elevational view of a skeleton model of the dynamic human model of FIGS. 1A-1C, in accordance with one preferred embodiment of the present invention.

FIG. 2B shows a side elevational view of the skeleton model shown in FIG. 2A.

FIG. 8 shows a foot of a dynamic human model, in accordance with one preferred embodiment of the present invention.

DETAILED DESCRIPTION

Figure 1A:
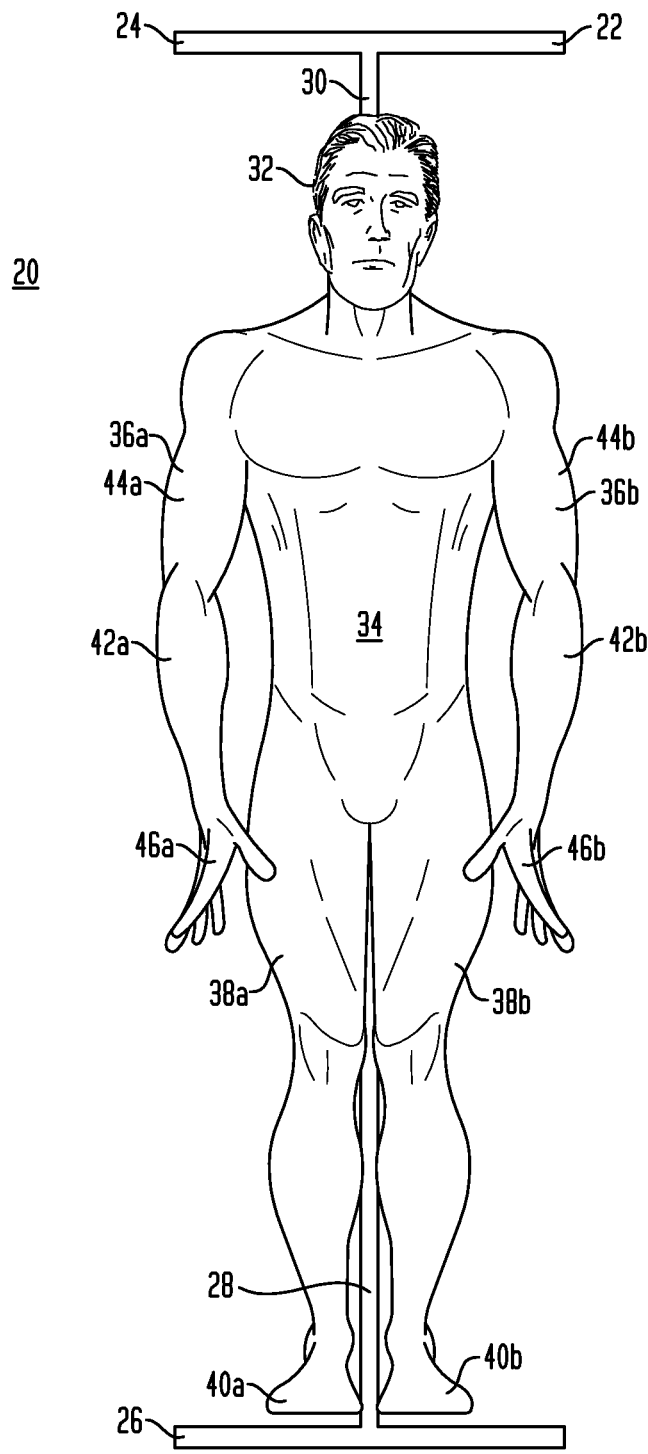
FIG. 1A shows a front elevational view of a dynamic human model, in accordance with one preferred embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

Figure 1B:
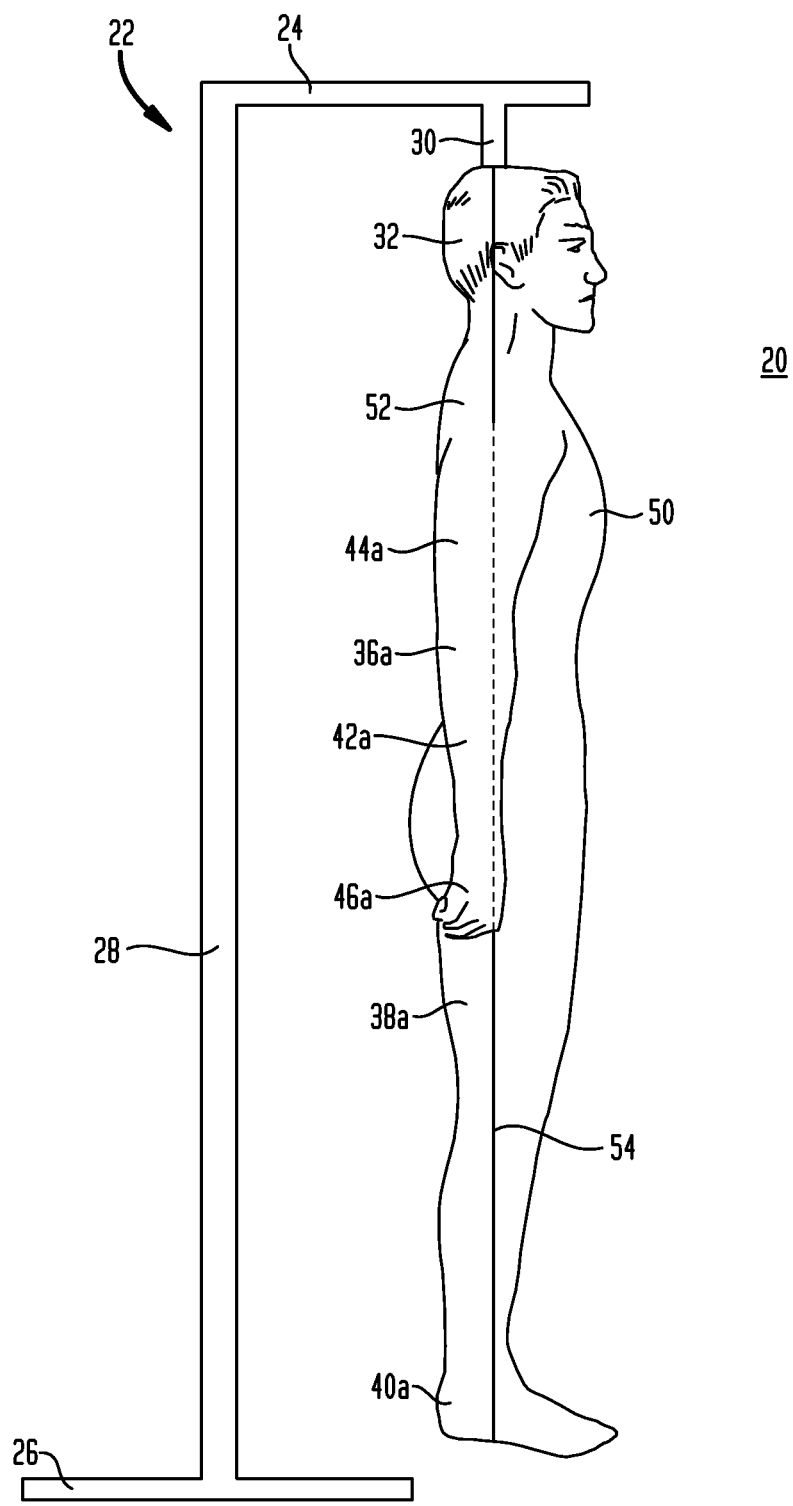
FIG. 1B shows a side elevational view of the dynamic human model of FIG. 1A.
Figure 1C:
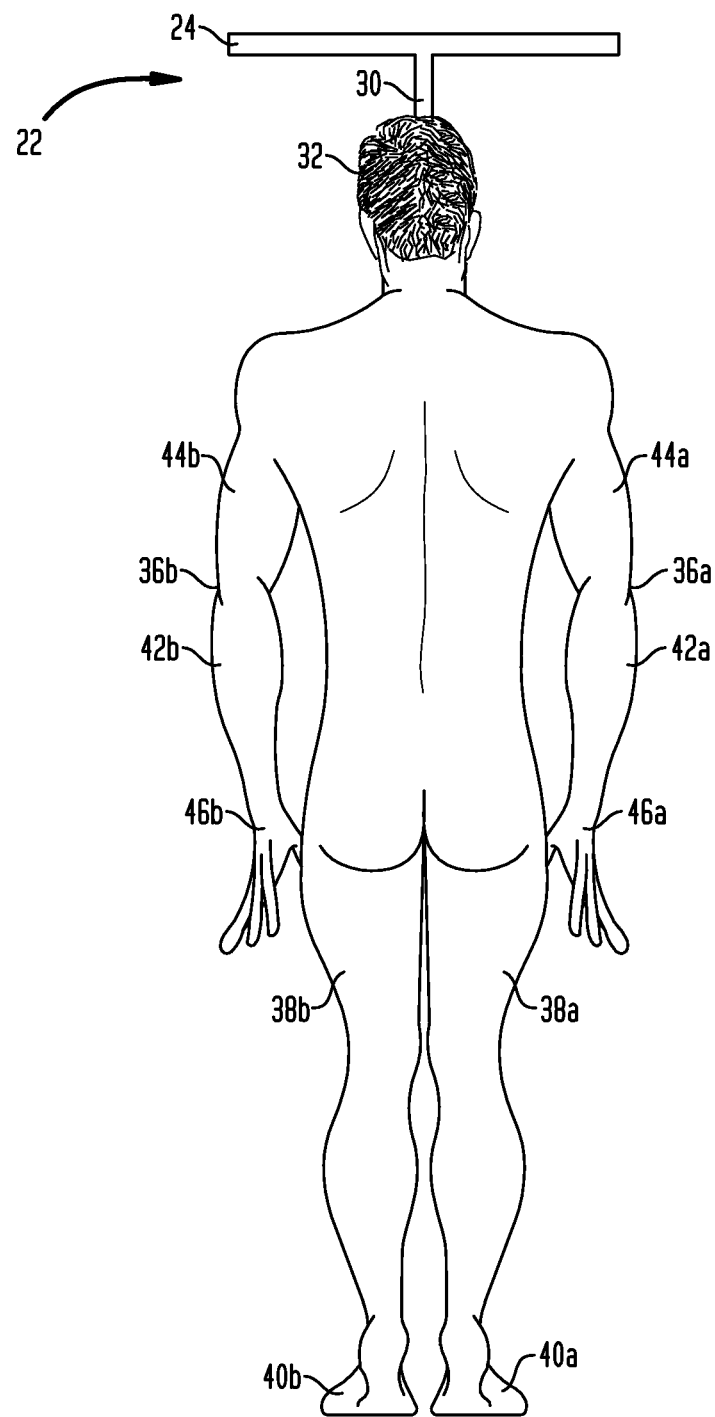
FIG. 1C shows a rear elevational view of the dynamic model of FIG. 1A.

Referring to FIGS. 1A-1C, in one preferred embodiment of the present invention, a dynamic human model 20 includes a stand 22 having an upper end 24, a lower end 26, a support shaft 28 extending between the upper end and the lower end, and an attachment flange 30 extending between the upper and 24 and the head 32 of the model 20.

The dynamic human model 20 includes the head 32, a torso section 34, arms 36A, 36B, legs 38A, 38B, and feet 40A, 40B. The model 20 is desirably anatomically correct and includes all of the parts normally found on a human body. The model 20 is dynamic so that the parts of the model may be moved relative to one another. For example, the arms 36A, 36B of the model may be moved through the normal range of motion with the forearms 42A, 42B being movable relative to the upper arms 44A, 44B, and the hands 46A, 46B being movable relative to the forearms 42A, 42B.

The dynamic human model is desirably adapted to be disassembled so that the underlying muscle, nerve, artery, organ, and bone structure may be observed. The outer skin of the model is preferably removable to reveal the underlying parts listed above. In one preferred embodiment, the outer skin is made from flexible materials that are able to flex and bend as the parts of the body are moved. In one particular preferred embodiment, the flexible material is a silicone material, an elastomeric material, rubber, or a polymeric material. In one embodiment, the flexible material includes two or more layers of silicone, with at least one of the layers including silicone reinforced by a fibrous layer. In another preferred embodiment, the flexible outer layer is a silicone material sold under the trademark 3B SKINLIKE by American 3B Scientific of Tucker, Ga.

Referring to FIG. 1B, in one embodiment, the removable outer skin includes an anterior section or first section 50 that covers an anterior region of the model, and a posterior section or second section 52 that covers a posterior region of the model. A seam 54 desirably separates the first section 50 and the second section 52 of the outer skin. The first and second sections 50, 52 may be secured together at the seam 54 using well-known fasteners such as a hoop and loop fastener (i.e. VELCRO), a zipper, adhesives including pressure sensitive adhesive, magnets, buttons, hooks, suction, etc.

Referring to FIG. 2A, in one preferred embodiment of the present invention, the dynamic model 20 includes a skeleton model 56 that is anatomically correct. The skeleton model may be made of bone, plastic, ceramic, or any material that may be shaped to appear similar to the parts of a skeleton. The skeleton model 56 is desirably dynamic so that all of the parts of the skeleton are movable through a natural range of motion for the human body. The skeleton model 56 includes a skull 58 having eye sockets 60 and a jaw 62 attached to a lower end thereof. The skeleton model 56 includes cervical region vertebrae 64, clavicle 66, scapula 68, and ribs 70. In addition, the skeleton model 56 includes humerus 72, radius 74, ulna 76, wrist bone 78, palm bones, and fingers 80. The skeletal model 56 also preferably includes lumbar region vertebrae 82, pelvis 84, femur 86, knee cap 88, tibia 90, fibula 92, ankle bones 94, and foot bones 96. It is noted that all of the bones in a human body have not been listed, that the above list is merely exemplary, and that preferred skeleton models of the present invention will include all of the bones found in the human body. The various parts of the skeleton model 56 are held together by flexible material such as elastomeric material, polymeric material, silicones or rubbers. The flexible material connecting together the various parts of the skeleton model may have the same shape, dimensions, appearance, and action as ligaments, tendons and/or cartilage. The various parts of the skeleton model are preferably designed to move relative to one another through a natural range of motion for a human. In one embodiment, the skeleton model includes one or more stops that prevent the parts of the model from moving beyond the natural range of motion of a human. The stops will provide a proper example of how far the various joints of the human body may be flexed and stretched.

Referring to FIG. 2B, in one embodiment, the skeleton model 56 is attached to an upper end 24 of stand 22 via an attachment flange 30 that extends from an underside of the upper end 24. The attachment flange 30 may be secured to the skull 58 of the skeleton model. As noted above, the various parts of the skeleton model 56 may be flexed relative to one another. For example, in FIG. 2B, one of the forearms 76 has been flexed relative to one of the upper arms and one of the legs 90 has been bent at the knee 88.

Figure 3:
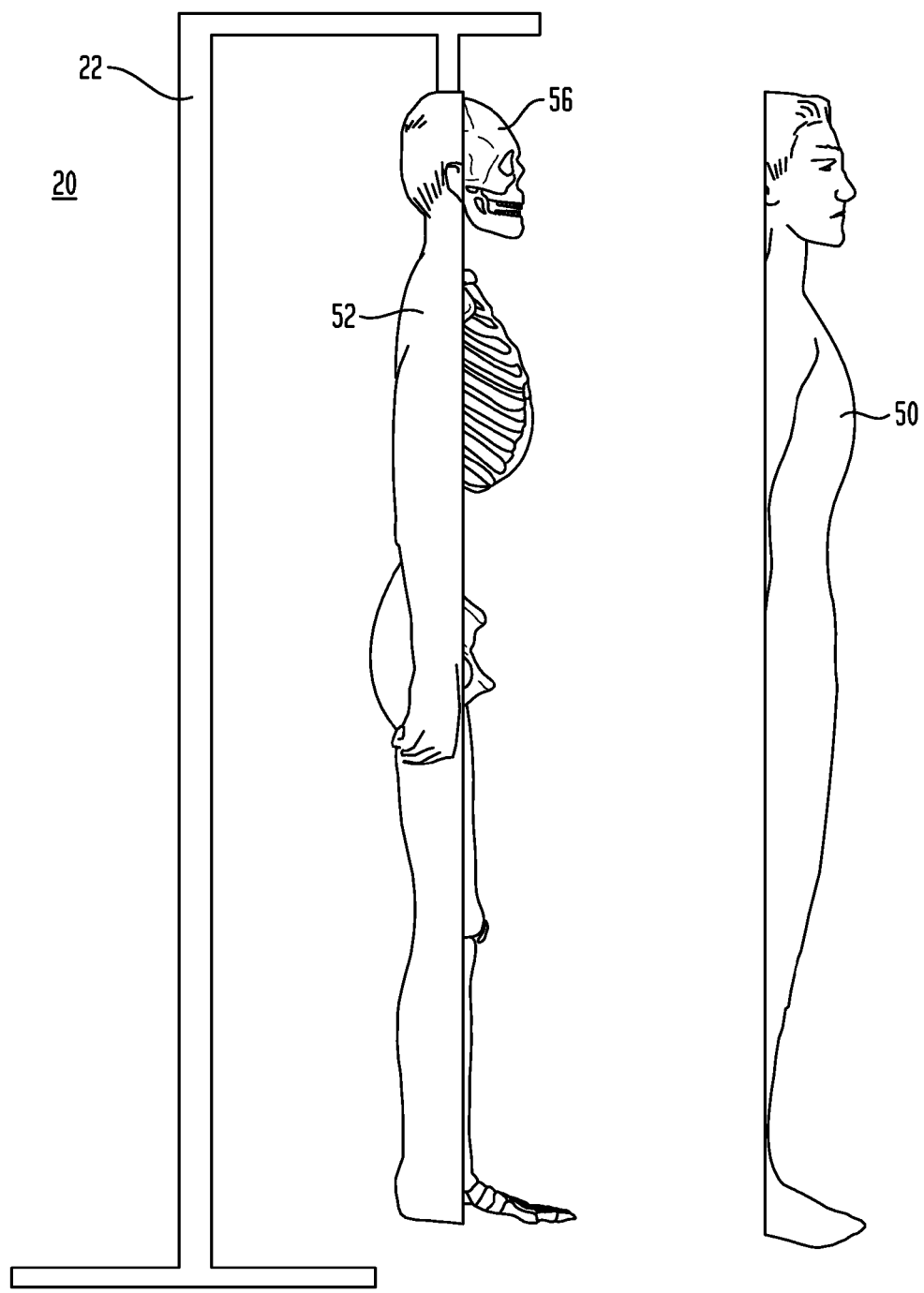
FIG. 3 shows a side elevational view of the dynamic human model of FIGS. 1A-1C with a front section of the model separated from a rear section of the model and the skeleton model of FIG. 2A.

Referring to FIG. 3, in one embodiment of the present invention, the dynamic model 20 is secured at the upper end thereof to a stand 22. The dynamic model 20 includes the skeleton model 56, the first outer skin section 50, and the second outer skin section 52. In the particular embodiment shown in FIG. 3, the first outer skin section 50 has been removed from the dynamic model 20 to expose the skeleton model 56, and the other parts of the body (e.g., ligaments, muscles, organs) that are assembled with the skeleton model. If desired, the second outer skin section 52 may also be removed to expose the posterior region of the skeleton model 56. After use, the first and second outer skin sections 50, 52 may be reassembled with one another to return the model to the state shown in FIG. 1B. The first and second outer skins may be repeatedly removed from and assembled with the skeleton model to provide a dynamic model that may be used numerous times. As noted above, the first and second outer skins are desirably made of silicone and may include two or more silicone layers. In one embodiment, at least one of the layers includes a silicone layer reinforced by a fibrous layer. The outer skins may have a color mixed therein to provide a particular pigment. The color may include a thermocolor or liquid crystals that change the appearance of the outer skins when the outer skins are heated up. In one embodiment, the outer skins may have different regions including different thermocolors or liquid crystals, which enable one region to have a first color and a second region to have another color. The feature of having different regions of the skin have different colors may be useful for showing a dermatome map or cutaneous innervation.

Figure 4A:
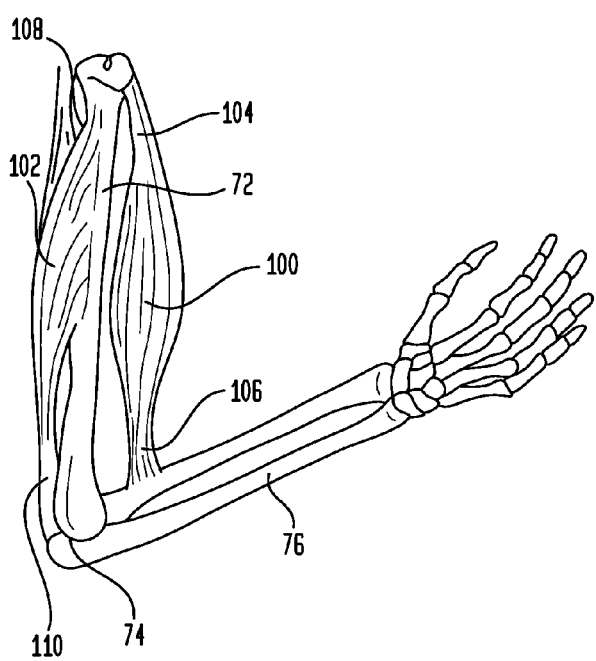
FIGS. 4A and 4B show an arm of a dynamic human model, in accordance with one embodiment of the present invention.
Figure 4B:
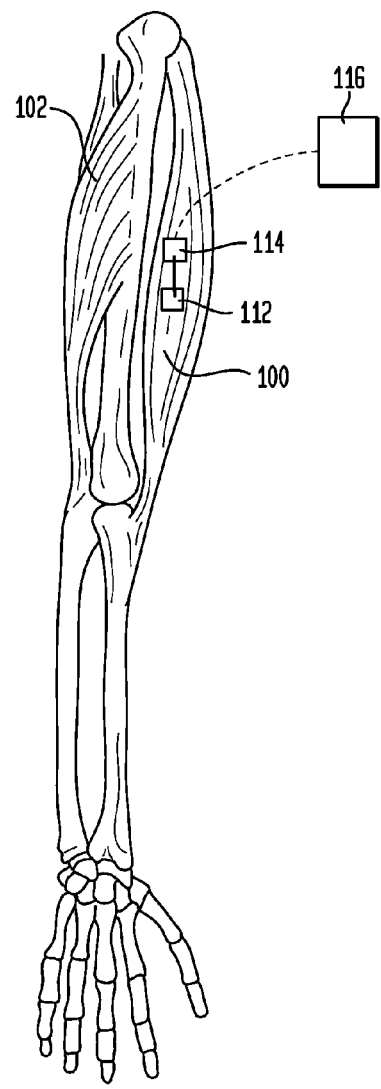

Referring to FIGS. 4A and 4B, in one embodiment of the present invention, a dynamic human model includes life-like muscles that may be attached to the skeleton model. Although FIGS. 4A and 4B show only one limb of a body, the present invention may include muscles attached to all of the different parts of the body. In FIG. 4A, a dynamic human model includes an upper arm 72 that is coupled with a forearm 76 by elbow section 74. The arm, which is bent, has at least two muscles secured thereto: a biceps muscle 100 and a triceps muscle 102. The biceps muscle 100 has a proximal end 104 attached to a proximal end of the upper arm 72 and a distal end 106 attached to a proximal end of the forearm 76. The triceps 102 has a proximal end 108 attached to a proximal end of the upper arm 72 and a distal end 110 attached to a distal end of the upper arm. The ends of the muscles 100, 102 may be attached to the bones 72, 76 using a variety of well-known fasteners such as clips, hooks, adhesive, magnets, VELCO, etc. The muscles 100, 102 are preferably removable from the bones for examination, and may be reattached to the bone(s) after examination.

FIG. 4A shows the arm in a bent position, and FIG. 4B shows the arm in a straightened position. As is well known to those skilled in the art, in order to move the arm into the bent position shown in FIG. 4A, the biceps muscle 100 contracts and the triceps muscle 102 stretches/extends. Conversely, in order to move the arm into the straight position shown in FIG. 4B, the triceps muscle 102 contracts and the biceps muscle 100 stretches/extends.

In one embodiment of the present invention, the muscles 100, 102 attached to the dynamic model are adapted to change color as they move between the contracted and stretched states. In one embodiment, the muscles may be darker in color when in a contracted state and lighter in color when in a stretched state. The color change may result from a chemical reaction that takes place within the muscle, whereby the color is darker when the muscle is denser in cross section and lighter when the muscle is less dense in cross section. In one embodiment, the color change may result from a system having one or more light emitting elements 112, such a light emitting diodes, disposed within the muscles. The system may include one or more sensors 114 coupled with the muscles for detecting movement of the muscles. The sensors 114 may be motion sensors, pressure sensors, piezoelectric sensors, etc. The sensors 114 are adapted to detect movement of the muscles and/or the direction of movement of the muscles. If the muscles are contracted, the sensors 114 will detect contracting movement and will activate one or more light emitting elements that are darker. As the muscles contract further, darker and darker light emitting elements will be activated. As the muscles are stretched, the light emitted by the light emitting elements will become lighter.

The system may also include a microprocessor 116 that is coupled with the one or more sensors 114 and/or the one or more light emitting elements 112. The microprocessor preferably receives signals from the sensors related to whether the muscles are being stretched or contracted. In response, the microprocessor 116 activates darker light emitting elements when the muscles are being contracted and lighter light emitting elements when the muscles are being stretched.

In one embodiment, the muscles may have a color mixed therein that provides a life-like appearance to the muscles. The color may be a thermocolor or liquid crystals. The colored muscles will be denser and thus appear darker when contracted, and less dense and lighter in color when stretched.

Figure 4C:
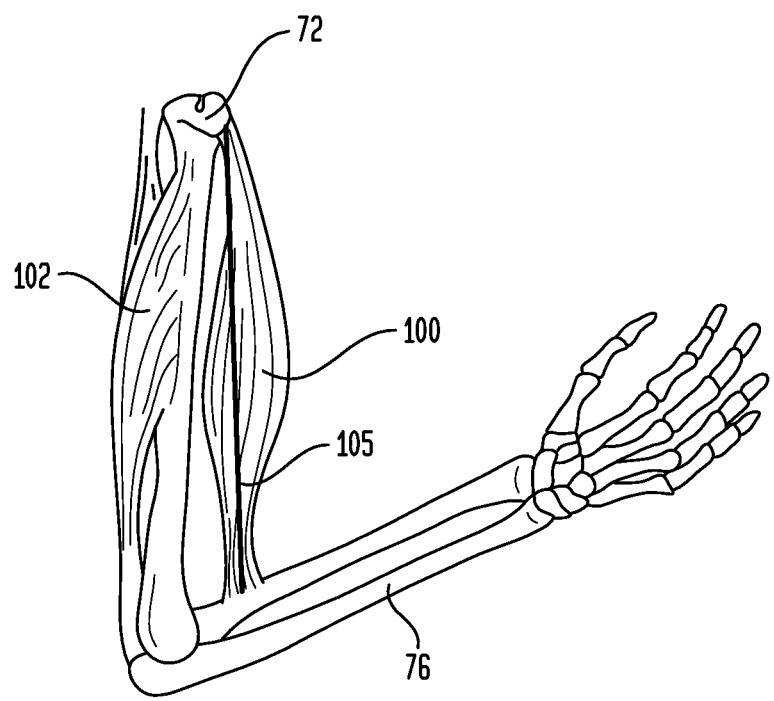
FIG. 4C shows an arm of a dynamic model, in accordance with another embodiment of the present invention.

Referring to FIG. 4C, in one embodiment, a guide rod may pass through one of the muscles to guide contraction and stretching of the muscle. In FIG. 4C, the guide rod 105 extends through the biceps muscle 100. The guide rod has an upper end secured to upper bone 72 and a lower end secured to lower bone 76. The guide rod will support the muscle during dynamic movement of the model to accurately depict how the muscles contract and stretch. The guide rod 105 may have a telescopic design that enables the ends of the guide rod to be compressed toward one another. The guide rod may also include a spring for returning the guide rod to an extended state after compression forces have been removed. In other embodiments, each muscle of the dynamic model may have one or more guide rods disposed therein for guiding contracting and stretching movement of the muscles.

Figure 5A:
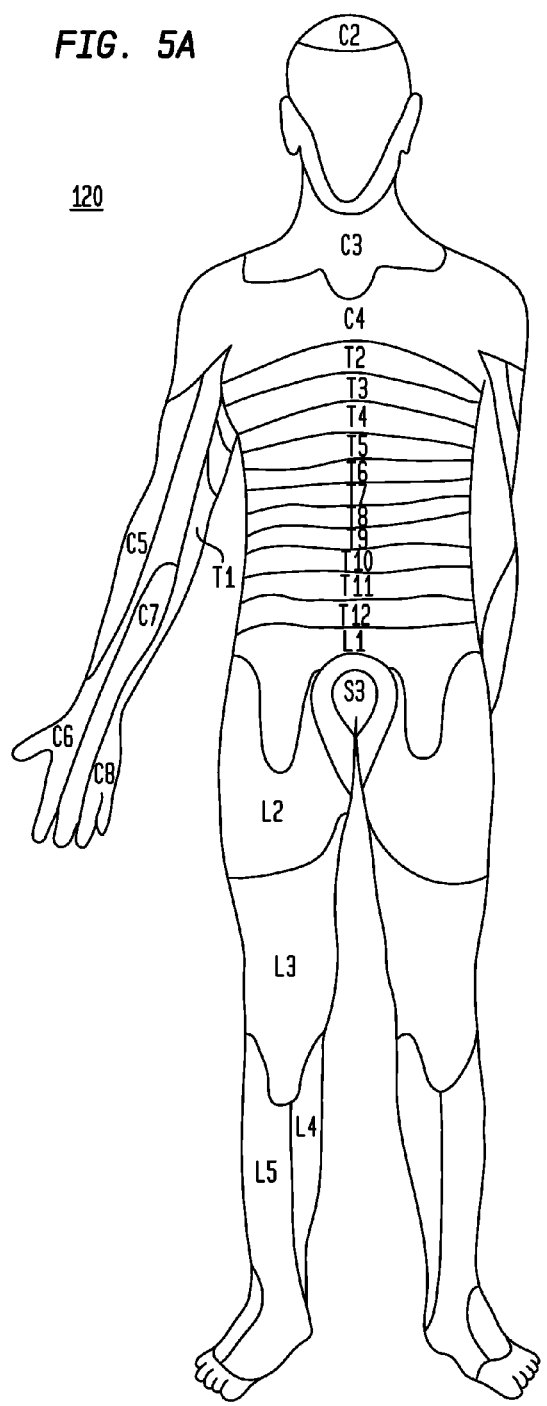
FIGS. 5A and 5B show a dermatome map for a dynamic human model, in accordance with one preferred embodiment of the present invention.
Figure 5B:
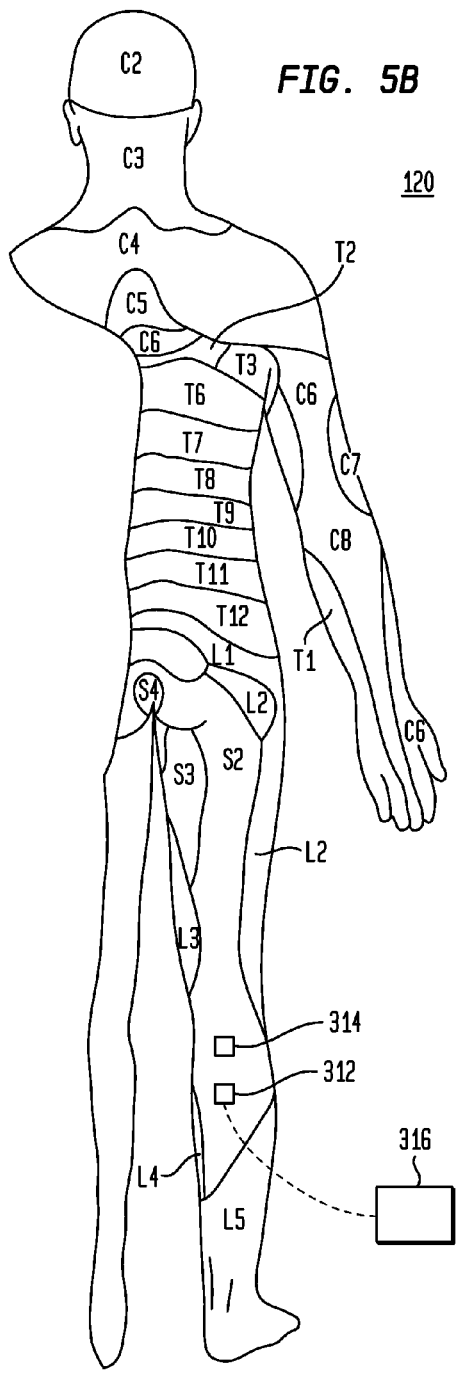

FIGS. 5A and 5B show a dynamic human model 120, in accordance with one embodiment of the present invention. FIG. 5A shows an anterior view of the model 120, and FIG. 5B shows a posterior view of the model 120. In one embodiment, a dermatome map of the body is printed on the outer skin of the model. Thus, the dermatome map is permanently visible on the outer skin. Providing the dermatome map on the outer skin enables the dynamic model 120 to be used as a teaching tool to show links between the skin surface of a human and where the nerves servicing that region originate in the spinal region. In one embodiment, the outer surface of the skin may have terms, such as S2 printed thereon. In other embodiments, the outer surface of the skin may have different colors printed thereon to identify different dermatome regions.

In one embodiment, the model 120 may incorporate a light generating system similar to the system described above in FIG. 4B. Referring to FIG. 5B, a region of the outer skin is associated with vertebral section S2. In one embodiment, the sensor 314 may be a pressure sensor that detects when a point within region S2 has been pressed. The sensor 314 will detect the pressure in the S2 region and send a signal to the microprocessor 316. The microprocessor 316 will then generate signals to activate light emitting element to light up the region of the skin associated with region S2. Thus, the system will highlight the region of the outer skin that is associated with vertebral section S2. In other embodiments, the model may have optical fibers for illuminating different regions of the outer skin. The optical fibers may transmit different colors to the different regions of the outer skin. The model may also include one or more light generating elements for generating the light transmitted through the optical fibers. The model may also be pressure sensitive so that upon applying pressure, such as by pushing down with a finger or probe, the liquid crystals disperse and cause a color change for the designated section.

Figure 6:
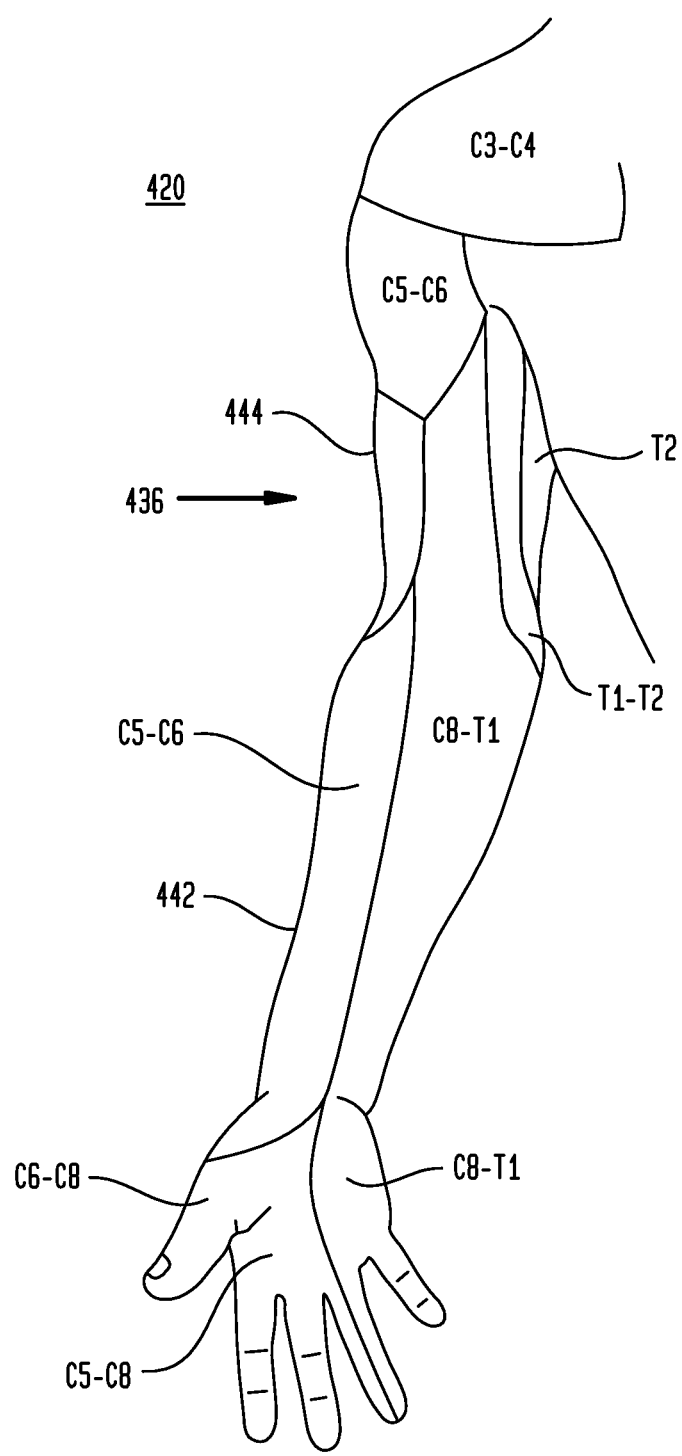
FIG. 6 shows an arm of a dynamic human model, in accordance with one preferred embodiment of the present invention.

Referring to FIG. 6, in one embodiment of the present invention, a dynamic human model 420 is adapted to show cutaneous innervation of the various parts of a human body. FIG. 6 shows a left arm 436 including a forearm 442 and an upper arm 444. The outer surface of the arm 436 has a cutaneous innervation pattern formed thereon whereby the arm is divided into regions showing which area of the skin is supplied by a specific nerve. In one embodiment, the specific nerve(s) associated with a particular area of the skin are printed on the outer surface of the model. In one embodiment, each different region may be identified by a different color. Each cutaneous innervation region may also include light emitting elements disposed therein that are adapted to be selectively illuminated to highlight the region and/or the boundaries between the regions. In certain embodiments, the model may also have a heat activated chemical incorporated therein that is activated when heated. As will be described in more detail below, a heated probe or electric probe may be pressed against a region, and the engaged region will change color and/or illuminate in response to the heat energy. In still other embodiments, the model may have fiber optics incorporated into the outer skin. The fiber optics may be selectively illuminated to highlight one or more of the cutaneous innervation regions.

Figure 7A:
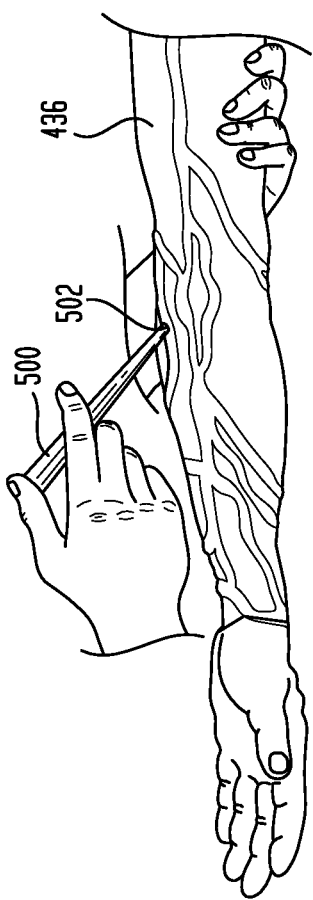
FIGS. 7A and 7B show an arm of a dynamic human model, in accordance with one preferred embodiment of the present invention.
Figure 7B:
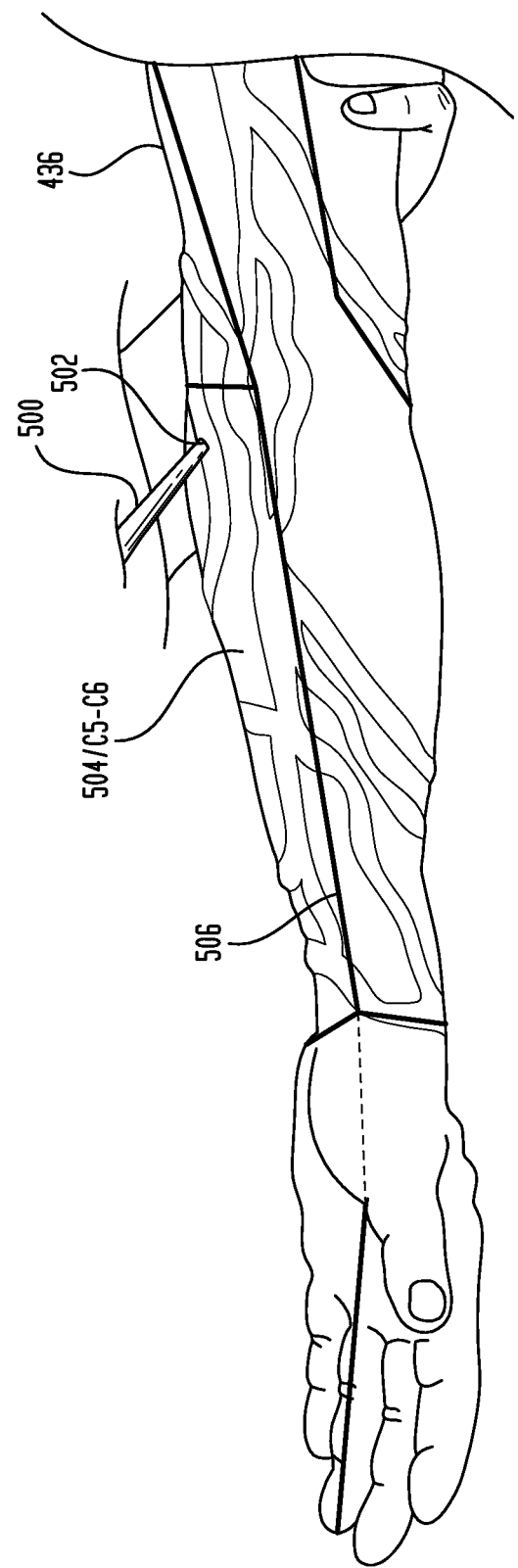

Referring to FIGS. 7A and 7B, in one embodiment, a probe 500 has a tip 502 that may be pressed against an outer surface of the arm 436. When the tip 502 of the probe 500 contacts the outer surface, the heat from the probe activates a first region 504 of the arm defined by the boundary 506. The first region 504 may change color or light up to show the area of the skin that is associated with nerves originating from the C5-C6 region of the spine. The color change may be due to a chemical reaction or the activation of light emitting elements. The light emitting elements may be selected from well-known light emitting elements including optical fibers and light emitting diodes.

Referring to FIG. 8, in one embodiment of the present invention, a dynamic human model 620 includes one or more of the features discussed above. The model 620 includes a foot 440 having an outer skin surface that is divided into regions R1-R5 that are supplied by specific nerves. The regions are divided from one another by boundary lines. In one embodiment, the designations for the regions R1-R5, the nerves associated with the regions, and the boundary lines are printed on the outer surface of the skin so as to be permanently visible to the naked eye. In one embodiment, each of the regions may have a specific color that indicates the specific nerve or nerves that supply the region.

Referring to FIG. 8, in one embodiment, the dynamic model includes a system for selectively illuminating the regions R1-R5 of the foot 440. The system desirably includes one or more light emitting elements 712 in each region and one or more sensors 714 in each region. The light emitting elements and the sensors are in communication with a controller 716 that may have a microprocessor and a memory chip. In one embodiment, the sensor 714 detects when a region of the skin (e.g. region R4) has been touched or probed, and transmits a signal to the controller 716 to identify the region. The controller 716 will transmit signals to the light emitting elements 712 in the region R4 to activate the light emitting elements in that region (i.e. R4). In response, the skin area in region R4 will illuminate so that the area of the skin supplied by L4 and L5 may be visually observed.

In one embodiment, the boundary surrounding the regions R1-R5 becomes visible when the region is probed. When the region is not probed, the boundary may be invisible. Text identifying the section of the vertebrae associated with a region may also become visible when that section is probed. The regions may also be illuminated by chemical reactions, such as thermal reactions or thermocolors. In other embodiments, optical fibers may be used to selectively illuminate the cutaneous innervation regions.

Figure 9:
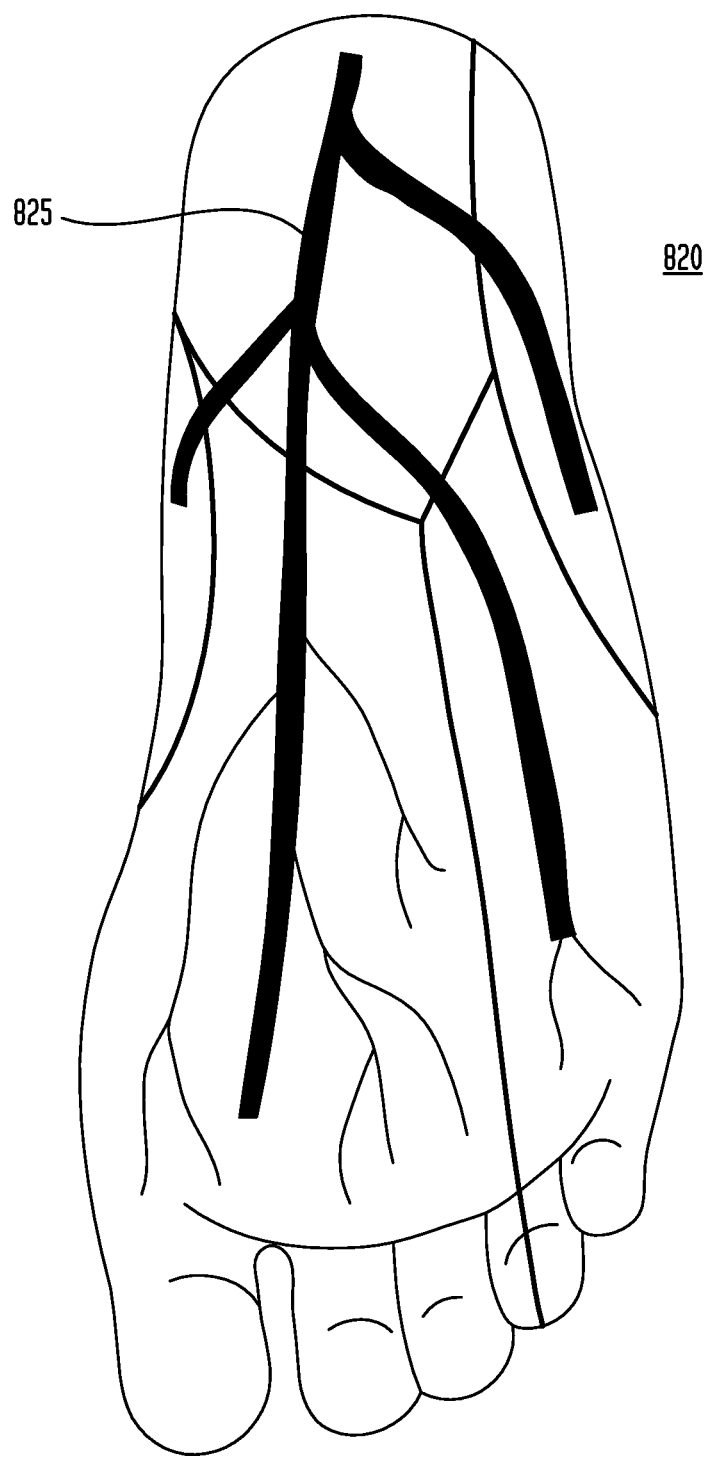
FIG. 9 shows a dynamic human model, in accordance with another preferred embodiment of the present invention.

Referring to FIG. 9, in one embodiment of the present invention, a dynamic model 820 may have an outer skin having optical fibers 825 extending therethrough. The optical fibers may be configured to match the dermatome map of a body. One or more of the optical fibers may be selectively illuminated to show how the nerves extend through the body. The optical fibers may also be illuminated to highlight the cutaneous innervation regions of the body. In one embodiment, the optical fibers may be selectively illuminated in different colors.

In the present invention, any of the elements or embodiments shown and described herein may be combined with any of the other elements or embodiments described herein and still fall within the scope of the present invention. For example, the structure shown and described in FIG. 9 may be incorporated into any part of the dynamic human model described herein.

While the foregoing is directed to embodiments of the present invention, other and further embodiments of the invention may be devised without departing from the basic scope thereof. For example, dynamic models similar to those disclosed herein may be provided for a wide variety of mammals including horses, cattle, dogs, and cats. It is contemplated that the present invention may be used to provide dynamic models for any type of animal, creature, or insect.

What is claimed is:

1. A dynamic human model comprising:
a skeleton model having a plurality of bone elements coupled together by articulating joints;
muscles attached to said bone elements, wherein said muscles are flexible for contracting and stretching, and wherein each said muscle has one or more optical elements disposed therein for generating a first color when said muscle is contracted and a second color when said muscle is stretched; and
at least one sensor disposed in at least one of said muscles for detecting whether the at least one of said muscles is contracted, stretched, or relaxed, wherein said at least one sensor is associated with at least one of said optical elements, wherein said at least one sensor is adapted to detect movement of said muscles and the direction of movement of said muscles, further comprising a microprocessor coupled with said at least one sensor and said optical elements, wherein said microprocessor is adapted to receive signals from said at least one sensor related to whether said muscles are contracted, stretched, or relaxed and in response activate one or more of said optical elements.

2. The dynamic human model as claimed in claim 1, wherein said first color is red and said second color is blue, and wherein said muscles have the red color when contracted and the blue color when stretched.

3. The dynamic human model as claimed in claim 1, wherein said one or more optical elements are selected from the group consisting of temperature responsive colorants, light emitting diodes, optical fibers, and lights.

4. The dynamic human model as claimed in claim 1, wherein said at least one sensor is adapted to detect a degree to which said at least one of said muscles is contracted, stretched, or relaxed.

5. The dynamic human model as claimed in claim 1, wherein said at least one sensor is selected from the group consisting of a motion sensor, a piezoelectric element, an optical sensor, and a pressure sensor.

6. The dynamic human model as claimed in claim 1, further comprising a controller including a microprocessor in communication with said at least one sensor and said one or more optical elements, wherein said controller generates signals having an intensity corresponding to the degree to which said muscle elements are contracted, stretched, or relaxed.

7. The dynamic human model as claimed in claim 1, further comprising a guide rod extending through at least one of said muscles for guiding contracting and stretching movement of said at least one muscle, wherein said guide rod has a first end connected with one of said bone elements and a second end connected with another one of said bone elements.

8. The dynamic human model as claimed in claim 1, further comprising a flexible outer skin securable over said skeleton model and said muscles, wherein at least a portion of said flexible outer skin may be removed for exposing said skeleton model and said muscles.

9. The dynamic human model as claimed in claim 8, wherein said flexible outer skin is selected from the group consisting of a silicone layer, a plurality of silicone layers, a fibrous layer covered by silicone, an elastomer, and a polymer.

10. The dynamic human model as claimed in claim 1, wherein said bone elements are selected from the group consisting of bone, osseous material, plastic, polymers, ceramics and glass.

11. The dynamic human model as claimed in claim 8, wherein said flexible outer skin is adapted to flex and bend with said skeleton model, and wherein said outer skin has optical elements incorporated therein for identifying areas of the skin that are supplied by a specific nerve.

12. A dynamic human model comprising:
a skeleton model having a plurality of bone elements coupled together by articulating joints;
muscles attached to said bone elements, wherein said muscles are flexible for contracting and stretching, and wherein each said muscle has one or more optical elements disposed therein for generating a first color when said muscle is contracted and a second color when said muscle is stretched;
at least one sensor disposed in at least one of said muscles for detecting whether the at least one of said muscles is contracted, stretched, or relaxed, wherein said at least one sensor is associated with at least one of said optical elements;
a flexible outer skin securable over said skeleton model and said muscles, wherein at least a portion of said flexible outer skin may be removed for exposing said skeleton model and said muscles, wherein said flexible outer skin is adapted to flex and bend with said skeleton model, and wherein said outer skin has optical elements incorporated therein for identifying areas of the skin that are supplied by a specific nerve; and
further comprising one or more pressure sensors disposed in said flexible outer skin and at least one microprocessor that receives signals from said one or more pressure sensors, wherein said microprocessor is in communication with said optical elements for selectively activating said optical elements in response to signals received from said sensors for lighting up a region of said flexible outer skin associated with a particular nerve.

\* \* \* \* \*